Figure 1:
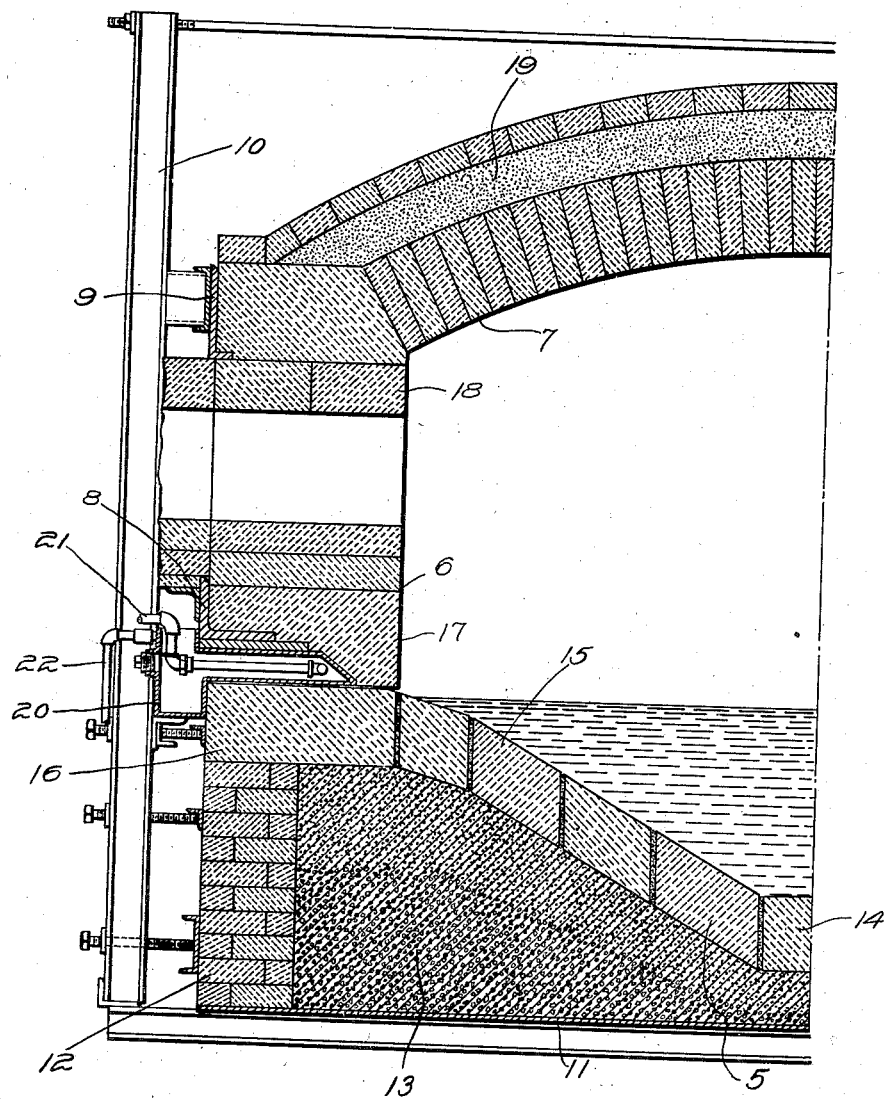

April 29, 1941.   P. G. WILLETTS   2,240,361
GLASS MELTING FURNACE
Filed April 26, 1938   2 Sheets-Sheet 1

Witness
W. B. Shafer.

Inventor
Paul G. Willetts
by Brown + Parham
Attorneys

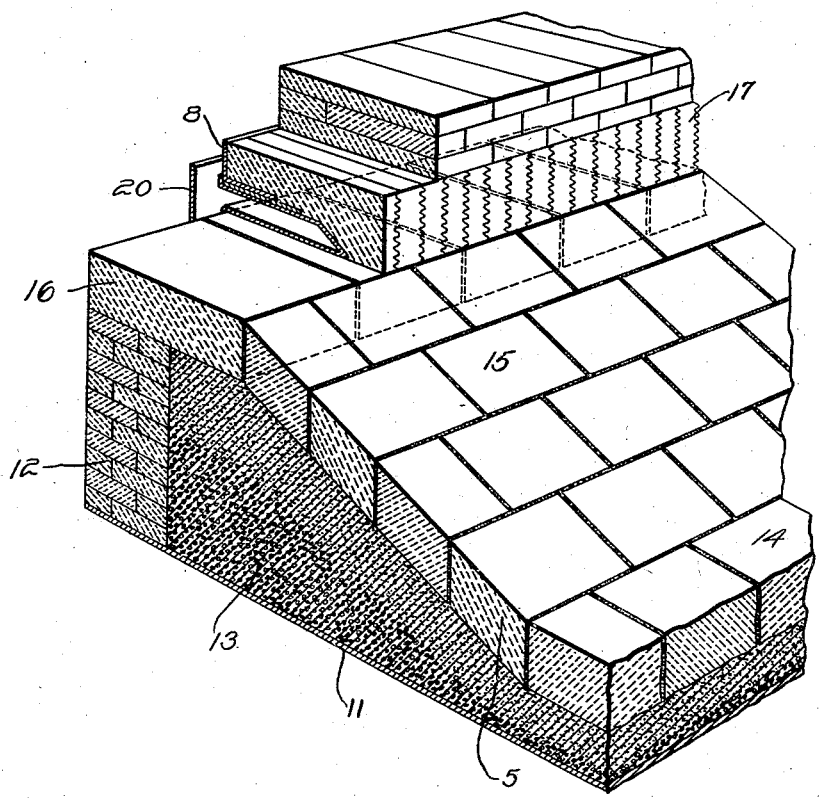

Patented Apr. 29, 1941

2,240,361

UNITED STATES PATENT OFFICE 2,240,361

GLASS MELTING FURNACE

Paul G. Willetts, West Hartford, Conn., assignor to Hartford-Empire Company, Hartford, Conn., a corporation of Delaware Application April 26, 1938, Serial No. 204,260

3 Claims. (Cl. 49—54)

This invention relates to glass melting furnaces and methods of constructing the same. Its general purpose is to increase the life and improve the performance of such furnaces.

The life of the usual glass melting furnace is relatively short due primarily to wall block failures caused by the intense heat and the corrosive action of the glass and glass-making constituents to which the blocks are subjected. These failures occur principally at the glass line and adjacent to any horizontal cracks or joints in or between the blocks. When such openings exist, the glass and the gases evolved therefrom pass into these openings and tend to drill upwardly behind the inner faces of the blocks causing the inner faces to break off or dissolve rapidly. The corrosion of the upper portion of the flux blocks which almost invariably occurs not only opens up horizontal seams, increasing the attack on the lower courses of the breast wall blocks, but destroys the under-support of the breast wall.

Moreover, the furnaces heretofore employed have been relatively inefficient and consume excessive amounts of fuel because of the great difficulty of suitably insulating the glass-containing portions thereof. When insulation is applied to this portion of the furnace, the glass while still relatively fluid penetrates between the blocks into the insulation, both destroying the insulation and introducing foreign constituents into the glass.

The principal object of this invention, therefore, is to overcome or greatly minimize the wear on the tank walls, particularly on the flux blocks and on the breast wall adjacent to the glass line.

A further object is to provide a well insulated container for the molten glass so constructed that objectionable penetration of the wall by molten glass is prevented and the wear on the blocks greatly reduced.

Among the specific objects are to provide a construction for the glass-containing portion of the tank which avoids the employment of horizontal joints at or below the normal glass line; to provide novel cooling means which may be rendered effective to reduce wear on the blocks at the metal line and also in the lower course of the breast wall and which is effective from the beginning of operations rather than after the blocks have suffered considerable wear; and to provide a novel construction for the lower course of the breast wall assuring adequate support for the upper structure through the life of the furnace.

Still a further object of the invention is to provide in a glass-making tank a glass-containing basin having sloping side walls formed of blocks that are rhomboidal in cross section and which when laid form only vertical joints, said blocks being laid upon granulated refractory material, the upper layer of which at least, being of such character as to be capable of reaction with molten glass brought in contact with it at the operating temperatures of the furnace to form a glass impervious layer.

In the accompanying drawings,

Figure 1 is a partial vertical cross section of a glass melting furnace embodying the present invention, and Fig. 2 is a perspective view of a portion of the bottom, side and breast walls of such furnace.

The furnace illustrated comprises a glass-containing basin 5, a breast wall 6 and a crown 7. The breast wall and crown are separately supported by angles 8 and 9 respectively, carried by the usual buckstays 10. The glass-containing basin is provided with a suitable bottom support 11, upon which rest retaining walls 12, which confine a layer of granular refractory material 13 which is so sized and graded as to give the desired insulating effect. The upper layer of the granular material is preferably of suitably sized material of the alumina-silica class, capable of reacting with molten glass at the temperatures of the furnace to form an impervious structure, preventing further penetration by the glass. Such material may be that described in my copending application Serial No. 66,662, filed March 2, 1936. Upon the layer 13 are laid blocks 14, 15 and 16 forming the bottom, sloping sides and rim of the glass basin. Preferably these blocks are of dense two-phase highly refractory material, for example, such as electrocast mullite blocks commonly known to the trade as "Corhart."

The blocks 14 may be of the usual shapes and sizes. The blocks 15 forming the sloping side walls are rhomboidal in cross section, so as to form a sloping inner surface and vertical joints between the blocks, the upper course of these blocks also forming a vertical joint with the top or rim blocks 16.

All the joints in the blocks forming the glass-containing basin are filled with a suitable material as, for example, the slip material described in my copending application Serial No. 172,660, filed November 4, 1937, now Patent No. 2,186,223 granted January 9, 1940, which upon preliminary firing of the furnace, reacts with the glassy phase of the blocks to effect a seal and form a substantially monolithic structure.

As shown in Fig. 2, the blocks are preferably laid with broken joints, so that any failure of the seal between the blocks opens only a relatively short seam, which may readily be closed at the bottom of the blocks by reaction of the glass and the granular material 13 beneath the layer of blocks.

As best shown in Fig. 2, the lower course of the breast wall is provided with blocks 17, the vertical sides of which are corrugated in a substantially horizontal direction as shown, so that the adjacent blocks are interlocked throughout the thickness of the wall, and will support the upper structure, even if considerable portions of the blocks are worn away. The upper structure of the breast wall is of standard construction, as is also the construction of the ports 18 and crown 19.

Means are provided for cooling the flux blocks adjacent to the glass line of the glass-containing basin and the lower course of the breast wall. This cooling means comprises a hollow metallic casing 20 having an outer upwardly facing trough portion, and a closed portion extending more than half the thickness of the breast wall inwardly from the outside of the tank. This casing is provided with a water supply pipe 21 and a drain pipe 22, so that water may be circulated within the casing to the desired extent. The casing extends inwardly beyond the angles 8 and provides part of the support for the breast wall. Preferably the casing is tightly cemented to the blocks 16 and 17 by a suitable refractory cement. By this arrangement the blocks 16 are cooled from above, and because of the fact that the blocks are relatively dense and are good heat conductors, this cooling effect extends forwardly to and below the glass line. This effect also extends forwardly of the blocks 17, keeping those blocks relatively cool and resistant to the destruction occasioned by the heat of the furnace and the action of glass-making materials.

The attack of the glass on the flux blocks, particularly at the glass line, is greatly reduced by reason of the provision of the sloping side walls, the absence of horizontal joints and the cooling provided. The combination of these features provides for a greatly increased life of the furnace. The slope of the walls and the absence of horizontal joints between blocks overcome the destructive upward drilling action of the gases, as these gases in the present furnace, when released, find no refractory to attack. The cooling means is effective, as pointed out, from the beginning of the operation, reducing the activity of the glass immediately in contact with the blocks and increasing the resistivity of the blocks to attack.

Heretofore it has been the practice when side wall blocks wear thin to apply cooling to their outer surfaces, and this cooling is effective when the blocks have become relatively thin to delay the erosion, but such means as have heretofore been employed are not effective in a relatively new furnace and are merely stop-gaps or makeshifts. Moreover the cooling in such cases is differently applied, and is ineffective to accomplish the purposes of the present means.

It will also be noted that the shape of the furnace basin facilitates the desirable convection movement within the tank.

The present invention constitutes a continuation in part of applicant's copending application Serial No. 76,967, filed April 29, 1936, for "Containers for molten glass," which has now matured into Patent No. 2,203,288 granted June 4, 1940.

Having described my invention, I claim:

1. A glass melting tank comprising a glass-containing basin, a breast wall having a lower course formed of blocks, the vertical faces of which are substantially horizontally corrugated and interlocking, and a combined cooling and supporting means extending inwardly of the wall for a major portion of the thickness of the breast wall, said cooling and supporting means being in intimate contact with the breast wall and the basin, whereby in the event one of the breast wall blocks cracks, the pieces thereof will be retained in position by the contiguous blocks.

2. A glass furnace comprising a glass-containing basin having a horizontal rim, a breast wall above and adjacent to the rim defining a flame space substantially coextensive in horizontal area with the surface area of a bath of glass in said basin at the normal level of such bath, the blocks of the lower course of said breast wall having their vertical sides substantially horizontally corrugated and interlocking, and being recessed at their outer bottom portions, a metallic cooling and supporting means located in said recess and extending inwardly of the breast wall a major portion of its thickness, means for supplying a cooling fluid to said cooling means to extract heat from the inner lower portions of the breast wall and from the upper portions of the rim and side walls of the glass-containing basin.

3. In a glass furnace, a glass-containing basin having sloping side walls formed of dense refractory materials and terminating above and adjacent to the normal glass level in rim blocks, a metallic hollow casing extending inwardly of the furnace wall for a major portion of the thickness of the rim blocks and laid in close association with said blocks, means for supplying a cooling liquid to the casing to cool the basin at and below the glass line, and a breast wall formed of interlocking, substantially horizontally corrugated blocks above and adjacent to the rim blocks and in part supported and cooled by said casing, whereby in the event one of the breast wall blocks cracks, the pieces thereof will be retained in position by the contiguous blocks.

PAUL G. WILLETTS.